UNITED STATES PATENT OFFICE.

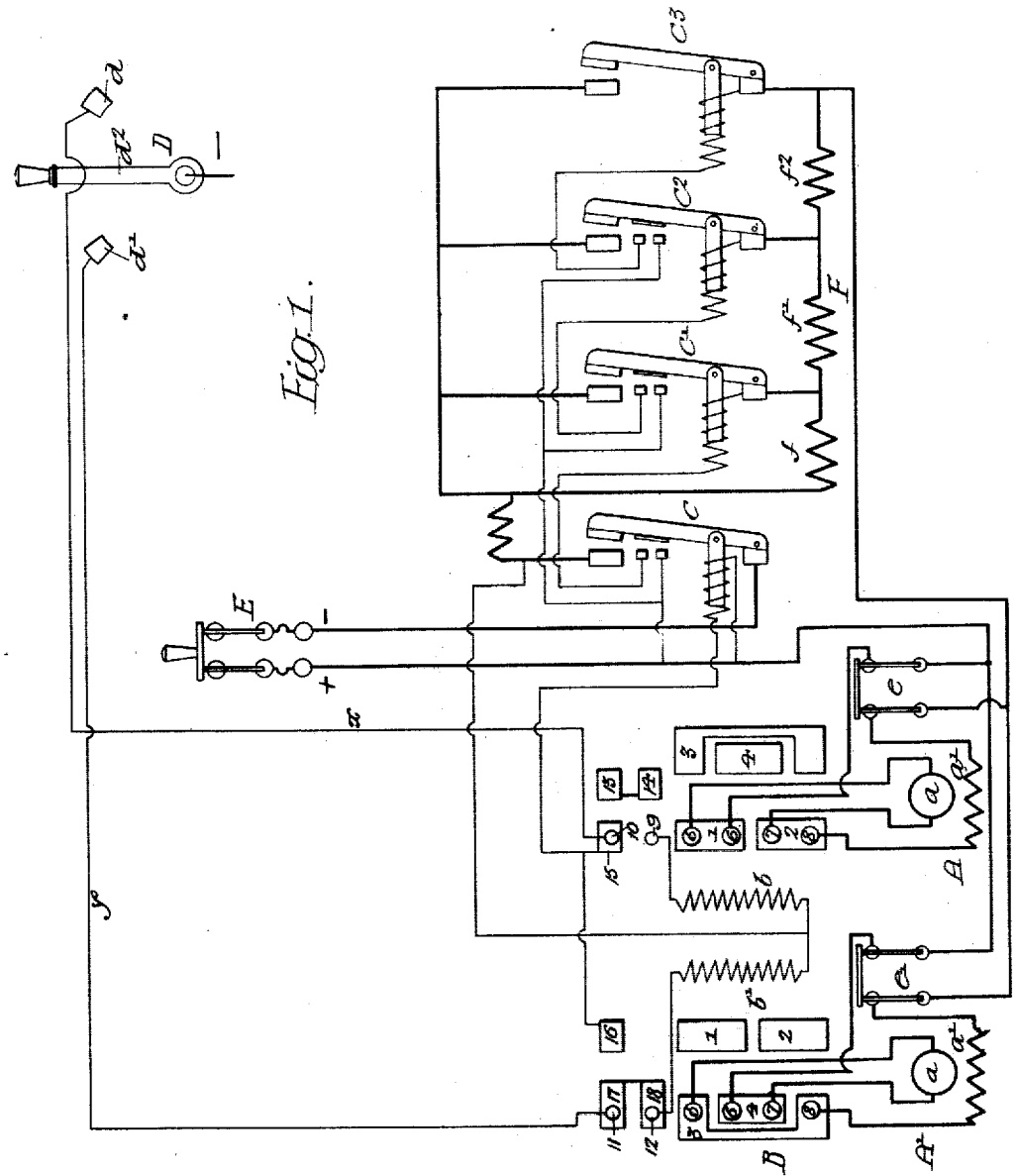

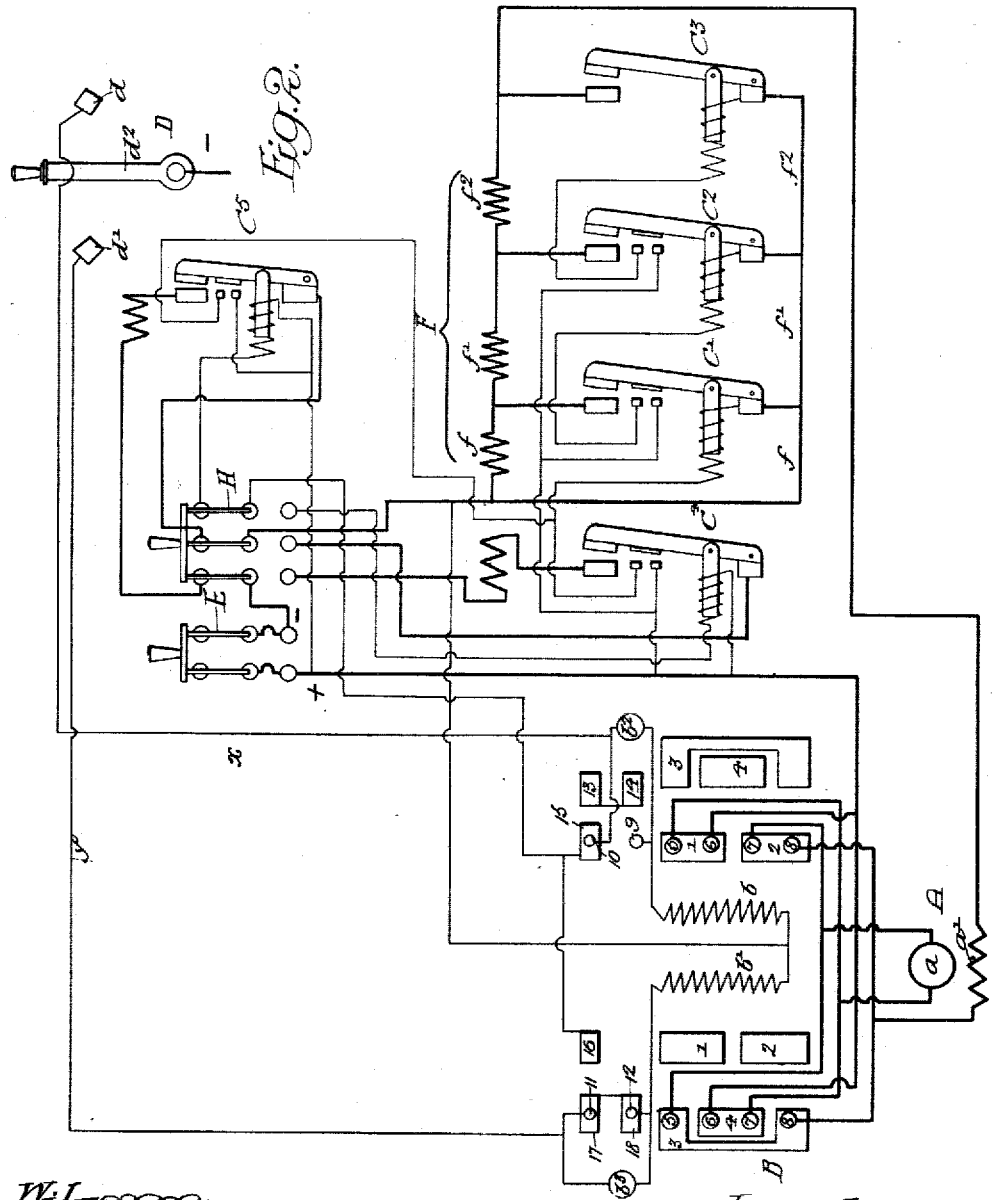

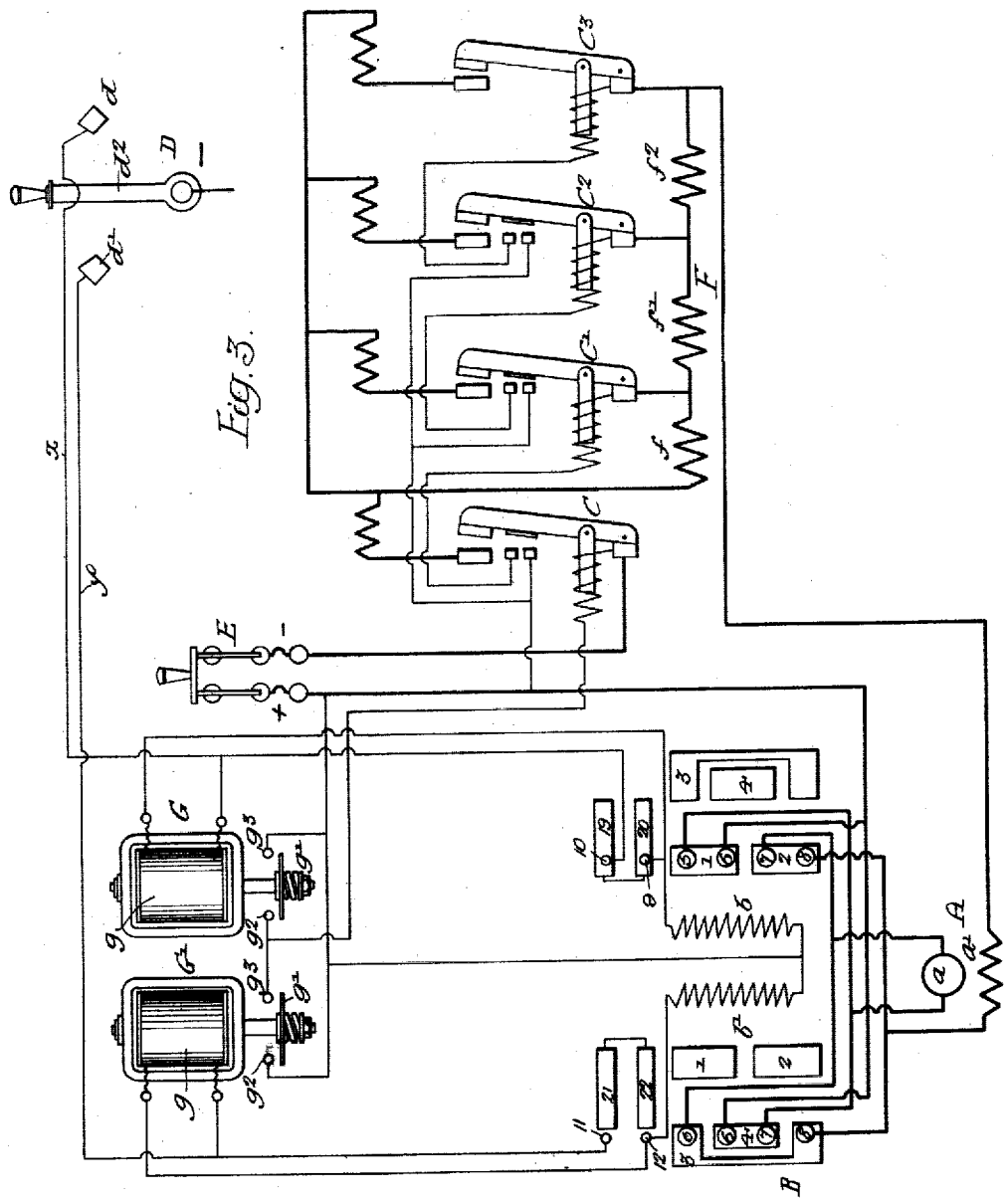

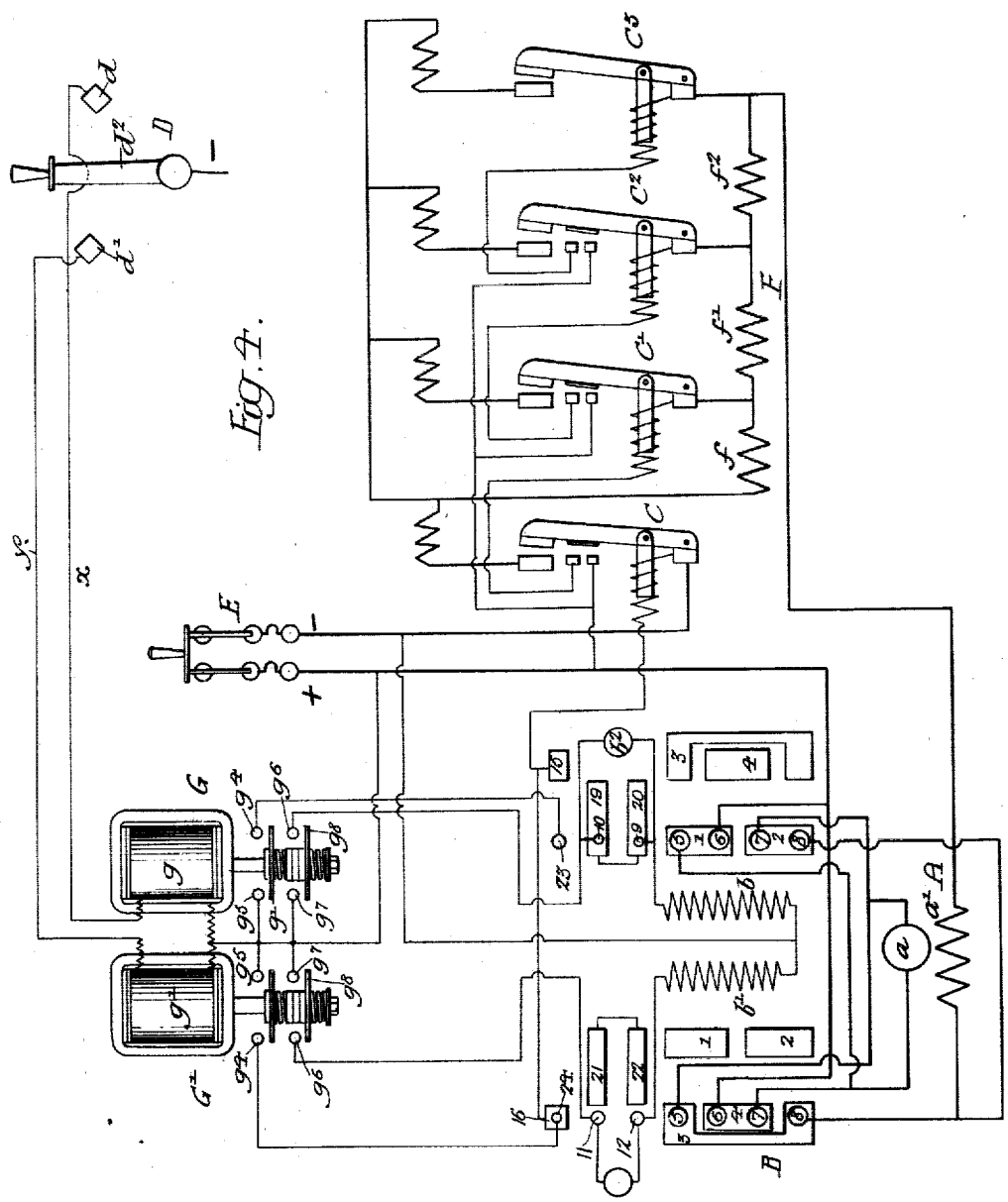

WILLIAM T. DEAN AND RUDOLPH TSCHENTSCHER, OF CHICAGO, ILLINOIS, ASSIGNORS TO THE ELECTRIC CONTROLLER AND SUPPLY COMPANY, OF CLEVELAND, OHIO, A CORPORATION OF OHIO.

SYSTEM OF CONTROL FOR ELECTRIC MOTORS.

No. 824,629.  Specification of Letters Patent.  Patented June 26, 1906.

Application filed November 2, 1905. Serial No. 285,630.

*To all whom it may concern:*

Be it known that we, WILLIAM T. DEAN and RUDOLPH TSCHENTSCHER, citizens of the United States, residing in Chicago, Illinois, have invented a System of Control for Electric Motors, of which the following is a specification.

Our invention relates particularly to a system for controlling motors from a point distant from them of such a character that the operation of one or any number of motors may be governed and but two wires be required to connect the master-controller with the apparatus for directing and controlling the current-flow to said motor or motors. Such a system is particularly designed for controlling the operation of a motor or motors on one or more cars of an electric-railway train, since there will be necessity for but two wires to extend the length of such a train from the master-controller.

One of the objects of the invention is to provide such an arrangement of apparatus and connections as will permit of the use of a relatively inexpensive reversing-switch and shall at the same time make it practically impossible for the main power-circuit to be completed before said reversing-switch has taken its proper position or for the said reversing-switch to operate until the main motor-switch is in a positive open position, thereby preventing any damage to the reversing-switch from arcing.

A further object of the invention is to so arrange the circuits of the system that the motor-current is broken only on the first resistance or motor-controlling switch, thus permitting the omission of magnetic blow-out coils for the remaining resistance-controlling switches and as a consequence further simplifying the required apparatus as well as reducing the cost of the same.

Another object of the invention is to so arrange the apparatus that under working conditions a time element is introduced between the successive operations of the various pieces of said apparatus, this being particularly desirable in case of the sudden reversal of a motor or motors running at full speed.

These objects we attain as hereinafter set forth, reference being had to the accompanying drawings, in which—

Figure 1 is a diagrammatic view illustrating our motor-controlling system in its simplest form. Fig. 2 is a diagrammatic view illustrating the reversing-switch and motor connections in a case where it is desired to operate but a single motor and in which under operating conditions current flowing through the reversing-switch solenoid is cut down to a predetermined figure instead of being cut off, as in the case illustrated in Fig. 1. This figure also illustrates an arrangement of apparatus and connections whereby it is possible to throw either one of two resistance-controlling switches out of circuit without interfering with the operation of the system in order to repair it. Fig. 3 is a diagrammatic view of our system, illustrating it as including a pair of solenoids governing pilot-switches respectively in circuit with the reversing-switch solenoids. Fig. 4 is a diagrammatic view of a form of our system having solenoids each governing two pilot-switches, of which one is in circuit with a reversing-switch solenoid and the other is in circuit with the first of the main motor-controlling switches.

Referring to Fig. 1 of the above drawings, A and A' are two motors to be controlled, these being in the present instance of the series type and each having an armature $a$ and a field-coil $a'$. The reversing-switch B (which is shown as diagrammatically developed) has a set of contacts for each of the motors and is also provided with fingers and contacts designed to govern the current-flow from the master-switch to the operating-coils $b$ and $b'$ of said reversing-switch as well as that to the operating-coil of the first motor-controlling switch. On the drum are carried two sets of metallic pieces, of which each set contains four members 1, 2, 3, and 4, so arranged that they coact with the contact-fingers, of which there are corresponding sets 5, 6, 7, and 8, to reverse the direction of rotation of the motors in the well-known manner. The position and operation of the drum carrying the two sets of contact-pieces is controlled by two solenoids, of which the windings are indicated at $b$ and $b'$. It will be seen that these windings at one end are connected to a common wire in connection with one of the terminals of the first motor-controlling switch C. The second terminal of the winding is connected to contact-finger 9, in the present case vertically under a second contact-finger 10, electrically connected to one of the train-wires $x$ and to contact $d$ of the master-switch D. The second contact $d'$ of said master-switch is connected to the second train-wire and to a contact-finger 11 on the reversing-switch, so placed as to be vertically over a finger 12 in connection with the second end of the winding $b'$. Upon the drum of the reversing-switch are placed two contact-pieces 13 and 14, electrically connected together, and in addition there is a contact-piece 15 in the same horizontal line as the piece 13, which is connected to a similar contact-piece 16 and to one end of the actuating-coil of the first motor-controlling switch C. The contact-pieces 15 and 16 are so placed as to be capable of engagement by the contact-finger 10, while the piece 14 is designed to be engaged by finger 9. There are in addition upon the drum of the reversing-switch other contact-pieces 17 and 18, connected to each other and respectively designed to be engaged by the two contact-fingers 11 and 12, of which the first is also capable of engagement with the contact-piece 16. E represents the main current-supply switch, the positive terminal of which is connected to suitable cut-out switches $e$ and $e'$ and to contact-finger 6 of the reversing-switch. The negative terminal of said switch is in connection with one of the terminals of the motor-controlling switch C, in addition to which there are motor-controlling switches $C'$, $C^2$, and $C^3$, whereby the amount of resistance in circuit with the motors A and A' is governed. This controlling-resistance F is in the present instance divided into three sections $f$, $f'$, and $f^2$ and is connected at one end to the second terminal of the switch C. At the points of junction of these various sections connection is made to the various switches $C'$, $C^2$, and $C^3$, and the end of the section $f^2$ is also connected through cut-out switches to one end of the field coils $a'$ of the motors. For a reason hereinafter appearing I may, as shown in Fig. 1, omit the magnetic blow-out coils from all of the switches except switch C, so that these switches may be of relatively simple and inexpensive construction. The upper terminals of the four motor-controlling switches are connected together, and the first three of these switches—viz., C, C', and C²—are provided with auxiliary switches, each in circuit with the actuating-coil of another switch, whereby successive action of the said switches is insured. The connections of the actuating-coils of these switches are preferably arranged as described and claimed in the patent to Arthur C. Eastwood, No. 772,277, October 11, 1904. Under operating conditions if the switch E be closed and the handle $d^2$ of the master-switch be made to engage with the contact $d'$ current will flow from the positive terminal of the main switch E, through the motors and the reversing-switch, as well as through the resistance F, to the upper terminal of the switch C, and from thence to the coil $b'$ of the reversing-switch through finger 12, contacts 18 17, finger 11, and through train-wire $y$ to the master-switch and the negative supply-main, which is in connection with the handle of said master-switch. This actuation of the winding $b'$ so moves the drum of the controller that one set of the contacts 1 and 2 are moved into engagement with the fingers 5, 6, 7, and 8, connected to the motor A', while the contacts 3 and 4 of the other set are moved into engagement with the fingers 5, 6, 7, and 8 of the motor A. At the same time the contacts 17 and 18 are moved out of engagement with the fingers 11 and 12, thus breaking the circuit of coil $b'$, while in addition contact 16 is moved into engagement with finger 11, thus completing the circuit from the positive supply-main through actuating-coil of the main motor-controlling switch C, through said contact 16, finger 11, and through the train-wire $y$ to the master-switch and the negative supply-main. The actuation of this coil at once closes the switch C, so that current is free to flow from the positive supply-main through the motors and the reversing-switch and also through the resistance F, switch C, and thence to the negative supply-main. The closure of switch C closes the auxiliary switch operated by it, so as to complete the circuit through the actuating-coil of switch C', and, as described in the patent above referred to, this switch is not closed until the current flowing to the motor has dropped to a predetermined point, at which time the voltage supplied to this coil is sufficient to cause it to close said switch C', thus cutting out of circuit the section of $f$ the resistance. Similarly, as the motors are further speeded up switches $C^2$ and $C^3$ are successively closed, though it is to be noted that if at any time during the operation of these switches the handle $d^2$ of the master-switch be moved out of engagement with the contact $d'$ the actuating-coil of switch C is deënergized, as are also the coils of the others of the resistance-controlling switches, so that the main motor-circuit is broken at the contacts of the switch C, which is provided with the necessary blow-out magnet to prevent damage from the arc formed. It is therefore noted that the arcing incident on breaking the main motor-current necessarily occurs at switch C, so that it is thus permissible to omit the blow-magnets from the remainder of the resistance-controlling switches C', &c. If the master-switch handle be moved from engagement with the contact $d'$ into engagement with the contact $d$, all of the switches C to $C^3$, inclusive, at once open, after which the circuit of the reversing-switch winding $b$ is completed through the motor-circuit to the upper terminal of switch C, finger 9, through contacts 14 and 13, finger 15, train-wire x, and the master-switch to the negative supply-main. This energization of the coil $b$ causes movement of the controller-drum so that the connections of the motors A and A' are changed to reverse the direction of rotation of said motors in the well-known manner, while in addition the circuit of the coil $b'$ is opened and the circuit of the actuating-coil of main switch C is closed, after which the switches C, C', $C^2$, and $C^3$ are successively operated to bring the motor up to speed. With this arrangement of apparatus and connections it will be noted that the operating-coil of the reversing-switch does not require current except upon actual movement of the contact-carrying drum, so that any possible heating of this coil is avoided and there is a considerable saving of current. It will further be noted that the connections are such as to make it impossible to cause closing of the switch C until the drum of the reversing-switch is in the position corresponding to a definite one of the positions of the operating-handle of the master-switch D. If desired, instead of cutting out or breaking the circuit of the coils $b$ and $b'$ of the reversing-switch after the drum of said switch has been moved to one or the other of its two positions we may connect between the fingers 9 and 10 a lamp or any other desired resistance, (indicated at $b^2$,) making a similar connection between the fingers 11 and 12, which includes such body of resistance $b^3$. With such an arrangement, as shown in Fig. 2, the movement of the switch-drum to the position illustrated will cause current to flow from the positive supply-main through the motor A, resistance F to coil $b$, for example, resistance $b^2$, train-wire $x$, master-switch D, and to the negative supply-main, thus maintaining said coil energized, but with a much reduced current. This arrangement might be desirable in case the solenoids $b$ and $b'$ are required to overcome the action of springs in turning the controller-drum, and where it is desired that as long as the motor or motors are operating said coil should be supplied with sufficient current to hold its core in a definite position, though such an amount would be less than that required to cause operation of the drum from its "off" position.

In Fig. 2 we have shown the arrangement of connections when but a single motor is connected to the controlling apparatus shown in Fig. 1 and have also shown means whereby provision is made for repairing the first resistance-controlling switch without interfering with the operation of the system.

When our system is employed for very severe work—as, for example, in connection with apparatus for adjusting the position of the rolls of a rolling-mill—it is evident that a great many moves of the rolls are necessarily made, since the distance between said rolls must be adjusted to a very small fraction of an inch. As a result the main motor-circuit is opened very frequently, and the contacts of the switch at which such opening occurs will, even though said switch be of the best design, depreciate very rapidly. In our system it is evident that this action would occur at switch C, and in order that the injured contacts may be repaired or replaced without interfering with the operation of the system we provide two switches $C^4$ and $C^5$ and a three-pole double-throw switch H in place of the single switch C illustrated in Fig. 1. The connections of the two switches $C^4$ and $C^5$ with double-throw switch H, are such that when said latter switch is in one position—as, for example, that shown—the switch $C^5$ is connected between the negative terminal of the main switch E and the point of junction of the bank of resistance F with the connection to the lower terminal of the resistance-controlling switch C'. At the same time the actuating-coil of this switch $C^5$ has one end connected to the contact 15 of the controller B, so that it is energized when the handle of the master-controller D is properly operated. With this condition existing it will be seen that the switch $C^4$ is out of service and may be repaired as desired without interfering with the operation of the system. On the other hand, if the switch H be operated to its other position the switch $C^4$ is put in service and its actuating-coil properly connected to be energized when the master-controller is operated. Under these conditions the switch $C^5$ may be repaired, it being noted that both terminals of said switch are dead or cut off from the system.

In the form of our invention shown in Fig. 3 we provide relay-switches G and G', each of which consists of a winding $g$, having a core carrying a disk $g'$, designed to electrically connect two contacts $g^2$ and $g^3$. The main contacts and fingers on the reversing-switch D are the same as in Fig. 2; but in place of the auxiliary contacts heretofore noted we provide two sets of contacts 19 and 20 and 21 and 22. As before, there are four fingers 9, 10, 11, and 12 for these auxiliary contacts, and while the fingers 10 and 11 are connected to the train-wires $x$ and $y$ the finger 9 is connected to one of the reversing-switch coils $b$ and also to one end of the winding of the relay-coil $g$, whose other end is connected to the train-wire $x$. One end of the reversing-switch coil $b'$ is similarly connected to finger 12 and also to one end of the coil $g$ of relay G', the second end of said coil being in connection with the train-wire $y$. The second ends of the coils $b$ and $b'$ are connected together and to a conductor connecting contact $g^2$ of the relay G with the contact $g^3$ of the relay G', which wire is also directly connected to the positive terminal of the main switch E. The contact $g^2$ of the relay G and contact $g^2$ of relay G' are connected together and to one end of the actuating-coil of the switch C, while the second end of this actuating-coil is directly connected to the negative supply-main. With this arrangement of apparatus and connections it will be seen that movement of the handle of the master-switch D into engagement with the contact $d$ permits current to flow from the positive supply-main to one end of the reversing-switch coil $b$, through said coil, finger 9, contacts 20 and 19, finger 10, train-wire $x$, to the master-switch, and so to the negative supply-main. The actuation of this coil then causes movement of the controller-drum, such that the relative connections of the field and armature of the motor A are reversed, in addition causing contacts 19 and 20 to move out of engagement with fingers 9 and 10, thereby compelling the current flowing through the switch-coil $b$ to also pass through the winding $g$ of the relay G. This not only cuts down the current through said switch-coil $b$, but also causes energization of said relay G, so that as a consequence the metallic piece $g'$ electrically connects contacts $g^2$ and $g^3$, when current is free to flow from the positive supply-main to contact $g^2$, piece $g'$, contact $g^3$, to the actuating-coil of switch C, and hence to the negative supply-main. The switch C then closes, as do subsequently the switches C', C$^2$, and C$^3$, in the manner above described.

It will be seen that with this arrangement of parts the relay G serves as an additional means for insuring the operation of the switch C after the reversing-switch has been placed in the proper position, for it is manifestly impossible for the coil $g$ of said relay to be energized until after the fingers 9 and 10 have been moved out of engagement with the contacts 19 and 20, which ordinarily short-circuit this coil. Moving the handle of the master-switch into engagement with its contact $d'$ first causes energization of the reversing-switch coil $b'$ and afterward places the coil $g$ of relay G' in series with it. The energization of this coil $g$ operates its switch and permits current to flow to the actuating-coil of the first motor-controlling switch C, it being understood, of course, that the reversing-switch has first operated to reverse the motor connections.

In the case shown in Fig. 4 we have provided the relays G and G' each with two switches, and while one end of each coil is connected to one of the terminals of the master-switch D their second ends are connected together and to the positive supply-main. Each of the relays has a pair of contacts $g^4$ and $g^5$, designed to be connected by a metallic piece $g'$, and has also two other contacts $g^6$ and $g^7$, designed to be connected by a second metallic piece $g^8$, insulated from the first, but carried by the same plunger. Contacts $g^5$ and $g^7$ of these switches are both connected to the positive supply-main, while the contacts $g^4$ are respectively connected to two fingers 23 and 24 of the reversing-switch. There are provided for these two fingers contacts 15 and 16, connected together and to one end of the actuating-coil of the first motor-controlling switch C, whose second end is connected to the negative supply-main. The contacts $g^6$ of the two relays are respectively connected to fingers 10 and 12, and the windings $b$ and $b'$ of the reversing-switch are respectively connected to fingers 9 and 10, while the opposite ends of these coils are connected together and to the negative supply-main. As in the case illustrated in Fig. 2, lamps or other suitable resistances $b^2$ and $b^3$ are connected between the fingers 9 and 10 and 11 and 12, respectively. With this arrangement of apparatus movement of the handle of the master-switch into engagement with contact $d$, for example, permits current to flow from the positive supply-main through the coil $g$ of the relay G, through train-wire $x$ to the master-switch, and so to the negative supply-main. The energization of this relay causes closing of its two switches, and consequently current flows from the positive supply-main to contact $g^7$, disk $g^8$, contact $g^6$, of this particular relay, thence to finger 10, contacts 19 and 20, finger 9, coil $b$ of the reversing-switch, and so to the negative supply-main. As a consequence the drum of the reversing-switch is turned so as to reverse the relative connections of the field and armature of the motor A and in addition causes the contacts 19 and 20 to move out of engagement with fingers 9 and 10. Current in the coil $b$ is then forced to pass through the resistance $b^2$, whereby it is cut down to any predetermined amount, while in addition contact 15 is moved into engagement with finger 23. Since the relay G closes both of the switches carried by its plunger, current is now free to flow from the positive supply-main to contact $g^5$, connecting-piece $g'$, contact $g^4$, finger 23, contact 15, actuating-coil of switch C, and then to the negative supply-main, thus closing said switch C and starting the motor, as previously described. As in the other connections illustrated, moving the handle of the master-switch to its off position causes opening of all the switches C to C$^3$, inclusive, and in this case in addition deenergizes the coil of relay G, besides breaking the circuit of the coil $b$ of the reversing-switch. Moving the handle of the master-switch into engagement with contact $d'$ energizes the coil of relay G' and after causing the reversing-switch to be operated in such a manner as to reverse the relative connections of the field and armature of the motor A permits current to flow to the actuating-coil of the switch C, as above noted.

It is to be noted in connection with the particular arrangement of the parts of our improved system (shown in Fig. 1) that it is impossible for the reversing-switch coils to be energized as long as the motor-controlling switches are closed—that is to say, if the system be in operation, with the handle of the master-switch on the contact $d$ and said handle be moved into engagement with contact $d'$, it will be seen that there is and can be no energization of the coil $b'$ of the reversing-switch, for the reason that both ends of it are connected to the negative supply-main, the first end through the wire $y$ of the master-switch and the second end through the motor-controlling switch C, and it is not until all of the motor-controlling switches have opened, as by the breaking of the circuit from the master-switch, that one end of the coil $b'$ can be supplied with current, which then flows from the positive supply-main through all of the motor connections and the resistance to the upper terminal of switch C. Therefore when the motor-controlling switches have finally opened the coil $b'$ is energized and the reversing-switch operated, after which said motor-controlling switches are again free to successively close, as previously noted. By reason of this characteristic it is practically impossible for even an unskilled operator to cause injury to the apparatus, and any defect in motors or wiring is at once made apparent by the non-operation of the reverse-switch when the master-controller is moved to the proper position.

While in Figs. 3 and 4 we have diagrammatically illustrated switches C', C², and C³ as provided with blow-magnet windings, it is understood that these are by no means necessary, since, as above noted, under operating conditions the main motor-circuit is broken only at the contacts of switch C.

We claim as our invention—

1. A system for controlling an electric motor or motors, consisting of a master-controller connected to the apparatus of the system by but two wires, a motor-reversing switch including main and auxiliary contacts governed by said controller, a motor-controlling switch or switches having an actuating coil or coils in circuit with certain of said auxiliary contacts, and means for preventing the current flowing to the auxiliary contacts until after the circuit of the main contacts has been completed at the reversing-switch, substantially as described.

2. A system for controlling an electric motor or motors, consisting of a two-point master-controller, motor-reversing mechanism governed thereby and connected to said master-controller by but two wires, a motor-controlling switch or switches, and means for preventing the actuation of said switch or switches until after the reversing-switch has operated, there being connections arranged to cause the main motor-current to be broken at a motor-controlling switch instead of at the reversing mechanism when the master-controller is moved to its "off" position, substantially as described.

3. A system for controlling an electric motor or motors, including a two-point master-controller, a reversing-switch having two operating-solenoids governed by said controller, and an electromagnetic motor-controlling switch, said reversing-switch including means so arranged that in one position thereof current will be supplied to one of the solenoids to move the switch to its other position and will subsequently be supplied to the coil of the electromagnetic switch, while in its other position current will flow directly to the coil of said motor-controlling switch, substantially as described.

4. A controlling system for an electric motor or motors, consisting of a master-switch connected to the apparatus of the system by but two conductors, a reversing-switch having two operating-coils governed by said master-switch, an electromagnetic motor-controlling switch, contacts operated by the reversing-switch and arranged to permit current to flow to the coil of the motor-controlling switch only after the reversing-switch has been brought to the position corresponding to that one of the master-switch contacts which is supplied with current, substantially as described.

5. A system for controlling an electric motor or motors, consisting of a two-point master-switch connected by but two wires to the apparatus of the system, a reversing-switch having two operating-coils governed by said master-switch, a series of electromagnetic motor-controlling switches, contacts operated by the reversing-switch and arranged to permit current from either of the contact-points of the master-switch to flow to the coil of the motor-controlling switch only after the reversing-switch has been brought to the position corresponding to that one of the master-switch contacts supplied with current, there being means whereby after the first motor-controlling switch is operated the remaining switches are caused to successively operate, substantially as described.

6. A two-point master-controller, motor-reversing mechanism including electromagnetic operating means governed by said master-controller, a motor-controlling switch or switches also governed by the master-controller, and means for automatically reducing the current-flow to the electromagnetic operating means of the reversing mechanism after the operation thereof, substantially as described.

7. A controlling system for an electric motor or motors, consisting of a master-controller, an electromagnetically-operated motor-reversing switch, an electromagnetic motor-controlling switch or switches, a switch in circuit with the coil of a motor-controlling switch, and a solenoid independent of the reversing-switch-operating means and of the motor-controlling switch or switches, for controlling the action of said coil-switch, said solenoid being connected to said master-switch, substantially as described.

8. A motor-controlling system, consisting of a reversing-switch having electromagnetic operating means, an electromagnetic motor-controlling switch or switches, a master-switch, a solenoid governed thereby, and two switches operated by said solenoid, one governing the flow of current to a motor-controlling switch, and the other permitting the current to flow to the electromagnetic means of the reversing-switch, substantially as described.

9. The combination in a motor-controlling system, of a reversing-switch having two actuating-coils, a master-switch having contacts for completing the circuit of either coil, a motor-controlling switch, and a connection between said coils and said switch, the connections of the system being such that when the motor-controlling switch is closed and the circuit of the master-switch is completed through one of its contacts, the two ends of the reversing-coil connected to another master-switch contact are connected to the same side of the current-supply circuit, substantially as described.

10. The combination in a motor-controlling system, of a reversing-switch having an actuating-coil, a master-switch having contacts for completing the circuit of said coil, a motor-controlling switch, and a connection between said coil and said switch, the connections of the system being such that when the motor-controlling switch is closed and the circuit of the master-switch is completed through one of its contacts, the two ends of the reversing-switch coil are connected through another master-switch contact to the same side of the current-supply circuit, substantially as described.

11. The combination in a motor-controlling system, of a reversing-switch having two actuating-coils, a master-switch having two contacts respectively connected to the ends of said coils, a motor-controlling switch, a motor-circuit having one end connected to one terminal of said motor-controlling switch and the other end connected to a supply-main, a connection from the second terminal of said motor-controlling switch, and a connection from the second ends of the reversing-switch coils to that terminal of the motor-controlling switch in connection with the motor-circuit, the master-switch being connected to the same side of the current-supply circuit as that to which the second terminal of the motor-controlling switch is connected, substantially as described.

12. A system for the control of an electric motor consisting of an electromagnetic relay-switch, a master-controller having but two wires connecting it to the apparatus of the system, a reversing-switch, an electromagnetic motor-controlling switch, and connections arranged to cause opening of the motor-controlling switch before the reversing-switch can be made to change its position when the master-switch is operated from its "on" position, substantially as described.

13. A system for the control of electric motors consisting of the combination of a plurality of electromagnetic relay-switches, a master-controller having but two train-wires connecting it to the apparatus of the system, a reversing-switch, a motor-controlling switch or switches, connections between said apparatus, with means arranged to cause successive operation of the apparatus to prevent a too sudden reversal of the motor or motors, substantially as described.

14. The combination in a motor-controlling system of an electromagnetic relay switch or switches, with a master-controller connected to the apparatus of the system by but two train-wires, a reversing-switch, a series of electromagnetic motor-controlling switches, and connections between said apparatus arranged to cause successive operation of said motor-controlling switches, substantially as described.

15. A system for the control of electric motors consisting of a plurality of electromagnetic relay-switches, a master-controller connected to the apparatus of the system by but two train-wires, a reversing-switch, a series of electromagnetic motor-controlling switches, and connections between said apparatus including means for preventing operation of certain of the motor-controlling switches until the current in the motor-circuit has fallen to a predetermined amount, substantially as described.

16. A system for the control of electric motors including a plurality of electromagnetic motor-controlling switches, a master-switch, and a switch connected to place either one of two of the motor-controlling switches out of circuit while retaining the other of said two switches in circuit under the control of the master-switch, substantially as described.

17. A system for the control of electric motors including a plurality of electromagnetic motor-controlling switches, a bank of resistance whose insertion in the motor-circuit is controlled by said switches, a double-throw switch connected to two of the motor-controlling switches for placing either of the same in circuit, and a master-switch for controlling the operation of that one of said motor-controlling switches so placed in circuit, substantially as described.

18. A system for the control of electric motors including a plurality of electromagnetic motor-controlling switches, a switch having contacts connected to two of said motor-controlling switches whereby either of them may be placed in or removed from the motor-circuit, said switch also including contacts respectively connected to the actuating-coils of said two motor-controlling switches, and a master-switch connected to said switch for governing the motor-controlling switches, substantially as described.

19. A system for the control of electric motors including a master-switch connected to the apparatus of the system by but two conductors, a reversing-switch having actuating means controlled by said master-switch, and a plurality of motor-controlling switches having actuating means controlled from the master-switch, one of said motor-controlling switches being provided with arc-rupturing means, the connections of the system being arranged to cause the motor-circuit to be first broken at the contacts of that motor-controlling switch having the arc-rupturing means, when the master-switch is thrown to its "off" position from any other position, substantially as described.

In testimony whereof we have signed our names to this specification in the presence of two subscribing witnesses.

WM. T. DEAN.
    RUDOLPH TSCHENTSCHER.

Witnesses:
    R. H. BOWLLEY,
    N. V. MORSE.